(12) United States Patent
Wang

(10) Patent No.: US 7,730,339 B2
(45) Date of Patent: Jun. 1, 2010

(54) REMOTE WAKE-UP FROM AN ENERGY-SAVING MODE

(75) Inventor: Yao-Tian Wang, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 743 days.

(21) Appl. No.: 11/602,625

(22) Filed: Nov. 20, 2006

(65) Prior Publication Data

US 2008/0120512 A1     May 22, 2008

(51) Int. Cl.
*G06F 1/00* (2006.01)
*G06F 1/32* (2006.01)
*G06F 3/00* (2006.01)

(52) U.S. Cl. .......................... 713/323; 713/320; 710/15

(58) Field of Classification Search ................. 713/300, 713/320, 323
See application file for complete search history.

(56) References Cited

U.S. PATENT DOCUMENTS

| | | | | |
|---|---|---|---|---|
| 5,819,013 A * | 10/1998 | Miyazaki et al. | ........... | 358/1.15 |
| 5,901,067 A * | 5/1999 | Kao et al. | ...................... | 700/11 |
| 5,933,581 A * | 8/1999 | Miyazaki et al. | ........... | 358/1.14 |
| 6,198,479 B1 * | 3/2001 | Humpleman et al. | ........ | 715/733 |
| 6,594,767 B1 * | 7/2003 | Wiley et al. | ................. | 713/300 |
| 6,618,772 B1 * | 9/2003 | Kao et al. | ...................... | 710/15 |
| 6,735,454 B1 * | 5/2004 | Yu et al. | ...................... | 455/574 |
| 6,760,415 B2 * | 7/2004 | Beecroft | ................. | 379/110.01 |
| 6,813,037 B1 * | 11/2004 | Collard | ........................ | 358/1.15 |
| 6,879,410 B1 * | 4/2005 | Tokura | ........................ | 358/1.14 |
| 7,167,260 B2 * | 1/2007 | Iwata et al. | ................. | 358/1.15 |
| 7,249,269 B1 * | 7/2007 | Motoyama | ................... | 713/320 |
| 7,516,889 B2 * | 4/2009 | Baldassari et al. | ........... | 235/383 |
| 2003/0056133 A1 * | 3/2003 | Talley | ......................... | 713/323 |
| 2005/0243365 A1 * | 11/2005 | Noda | ......................... | 358/1.15 |

FOREIGN PATENT DOCUMENTS

JP        2004188713 A    *    7/2004

* cited by examiner

*Primary Examiner*—Suresh K Suryawanshi
(74) *Attorney, Agent, or Firm*—Hickman Palermo Truong & Becker LLP; Edward A. Becker

(57) ABSTRACT

A method and apparatus for communicating with a device is provided. A user views a graphical user interface displayed on a client. For example, the graphical user interface may correspond to a web page or a graphical user interface of an operating system. The graphical user interface may display an icon. The display of the icon may indicate, to the user, whether a device, associated with the icon, is in an energy-saving mode. The user may configure the icon to cause the client to issue requests to the device. A request, sent from the client to the device, may instruct the device to exit the energy-saving mode. In this way, the user may instruct a device to exit the energy-saving mode (i.e., to "wake-up") prior to issuing a request for the performance of a service (such as a request to print an electronic document) to the device.

18 Claims, 10 Drawing Sheets

FIG. 7

REQUEST FROM CLIENT MODULE 112
TO COMMUNICATIONS MODULE 122

```
<soap: env>
  <soap:header>

<wsn: Action>
      WakeupFromESMode
    </wsn: Action>

</>
  <soap: body>
    <WakeUpFromES>
      <Wake Time> 30.0 minutes </Wake Time>
      <Wake Component> Printer </Wake Component>
    </WakeUpFromES>
  </soap: body>
</soap: env>
```
702

RESPONSE FROM COMMUNICATIONS MODULE 122
TO CLIENT MODULE 112

```
<soap: env>
  <soap:header>  </>
  <soap: body>
    <WakeUpFromESRespose>
      <component>
        <name> Printer </name>
        <state> Online/Awake </state>
      </component>
    </WakeUpFromESResponse>
  </soap:body>
</soap:env>
```

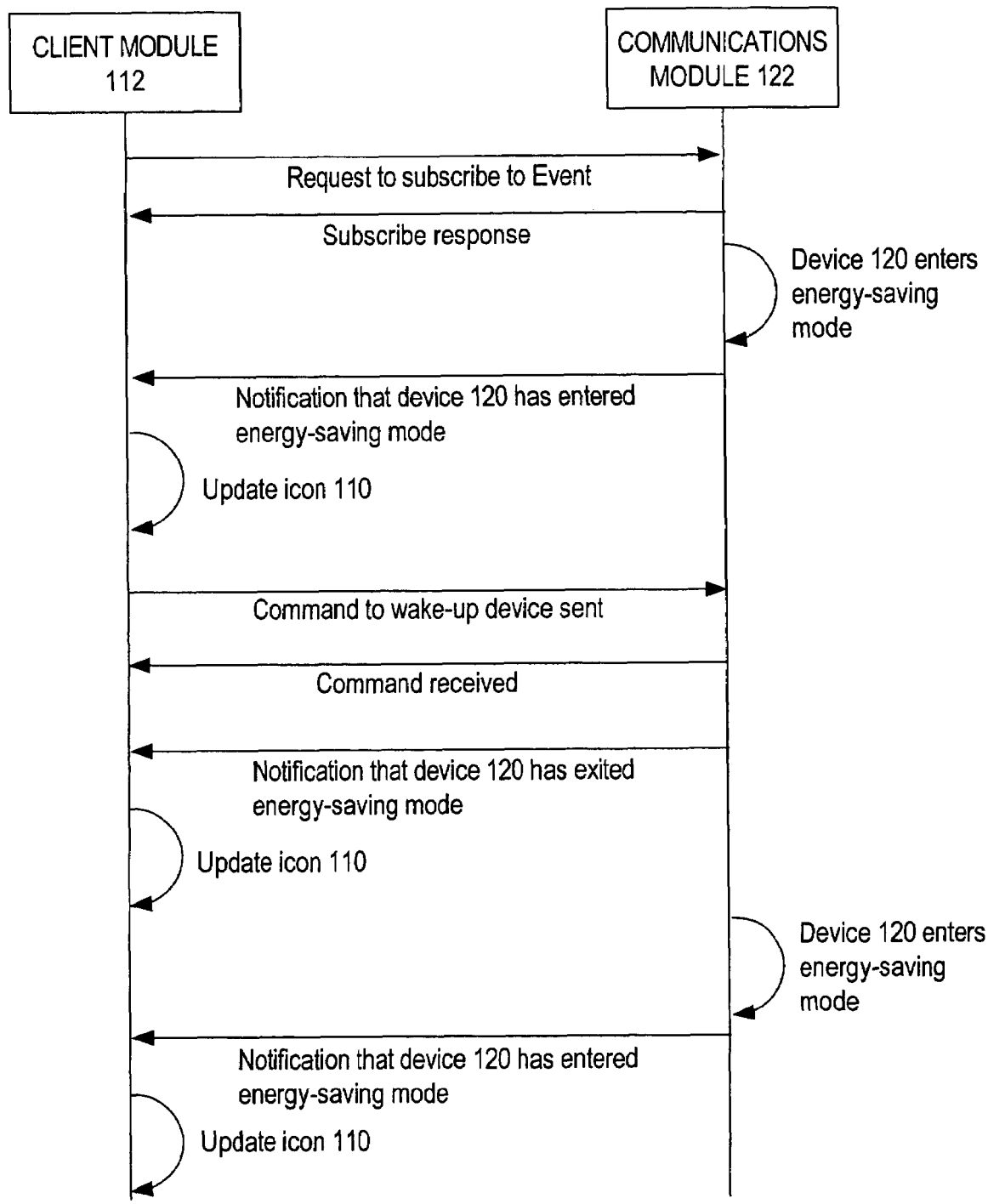

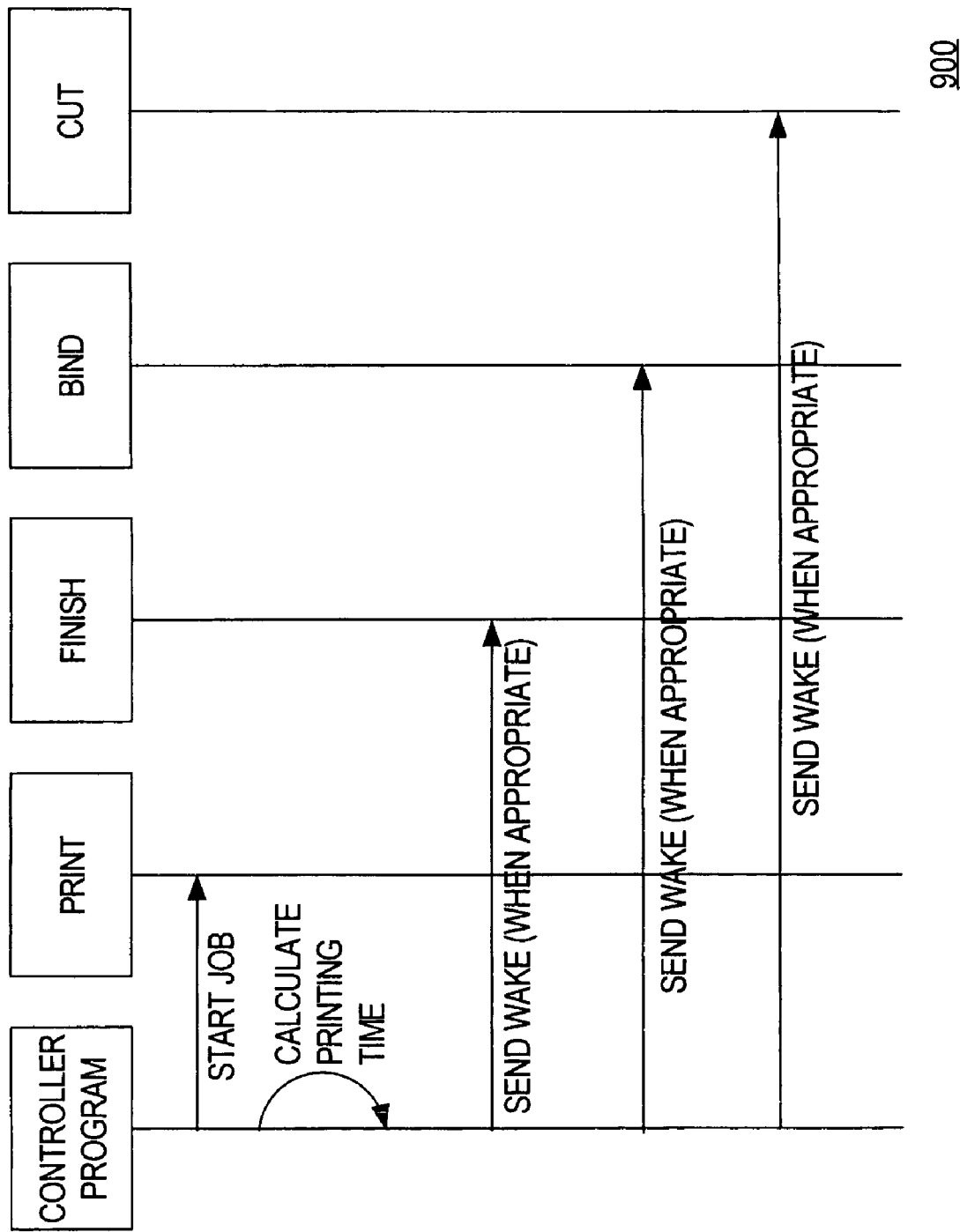

REMOTE WAKE-UP FROM AN ENERGY-SAVING MODE

FIELD OF THE INVENTION

The present invention generally relates to remotely identifying and/or changing the state of a device, e.g., the state of a device may correspond to an energy-saving mode of the device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Certain electronic devices may operate in an energy-saving mode. When a device is in an energy-saving mode, the device consumes less power than it normally does by running one or more components of the device at less than full power. For example, certain printers may enter an energy-saving mode if the printer is not used within a specified amount of time. When the printer is in the energy-saving mode, the printer may not be able to provide certain functions that the printer may normally provide when the printer is operating normally.

In order to cause a device to exit an energy-saving mode (or "wake-up" the device), a user may physically manipulate an interface provided by the device to instruct the device to wake-up. For example, to wake-up a printer that is in an energy-saving mode, a user may physically walk up to the printer, and press a button on the printer to cause the printer to wake-up. Another way to cause a printer to exit the energy-saving mode is for a user to send a print request, electronically over a communications link, to the printer.

Unfortunately, devices may require a certain amount of time and/or resources to wake-up. For example, to wake-up a printer, the printer may need a certain amount of time to perform tasks necessary to prepare the printer for printing, such as warming the oil of the printer and readjusting the color ink of the printer. Thus, after the user causes the printer to exit the energy-saving mode, the user will need to wait a certain amount of time for the printer to exit the energy-saving mode before the printer is able to print the requested document.

SUMMARY

Techniques are provided for remotely identifying or changing the state of a device. These techniques may be used to remotely instruct a device to exit an energy-saving mode. These techniques may also be used to inquire about the current status of the device, e.g., a user may be able to ascertain whether the device is currently operating in an energy-saving mode.

In an embodiment, a user may view a graphical user interface displayed on a client. For example, the graphical user interface may correspond to a web page or a graphical user interface of an operating system. The graphical user interface may display an icon. The display of the icon may indicate, to the user, whether a device, associated with the icon, is in an energy-saving mode. The user may configure the icon to cause the client to issue requests to the device. A request, sent from the client to the device, may instruct the device to exit the energy-saving mode. In this way, the user may instruct a device to exit the energy-saving mode (i.e., to "wake-up") prior to issuing a request for the performance of a service (such as a request to print an electronic document) to the device.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 7 is an illustration of communications exchanged between a client module and a communications module according to an embodiment of the invention;

FIG. 8 is a process diagram of a client module communicating with a communications module according to an embodiment of the invention;

FIG. 9 is a process diagram of a system involving two or more logical device groups according to an embodiment of the invention.

DETAILED DESCRIPTION

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

System Overview

Figure 1:
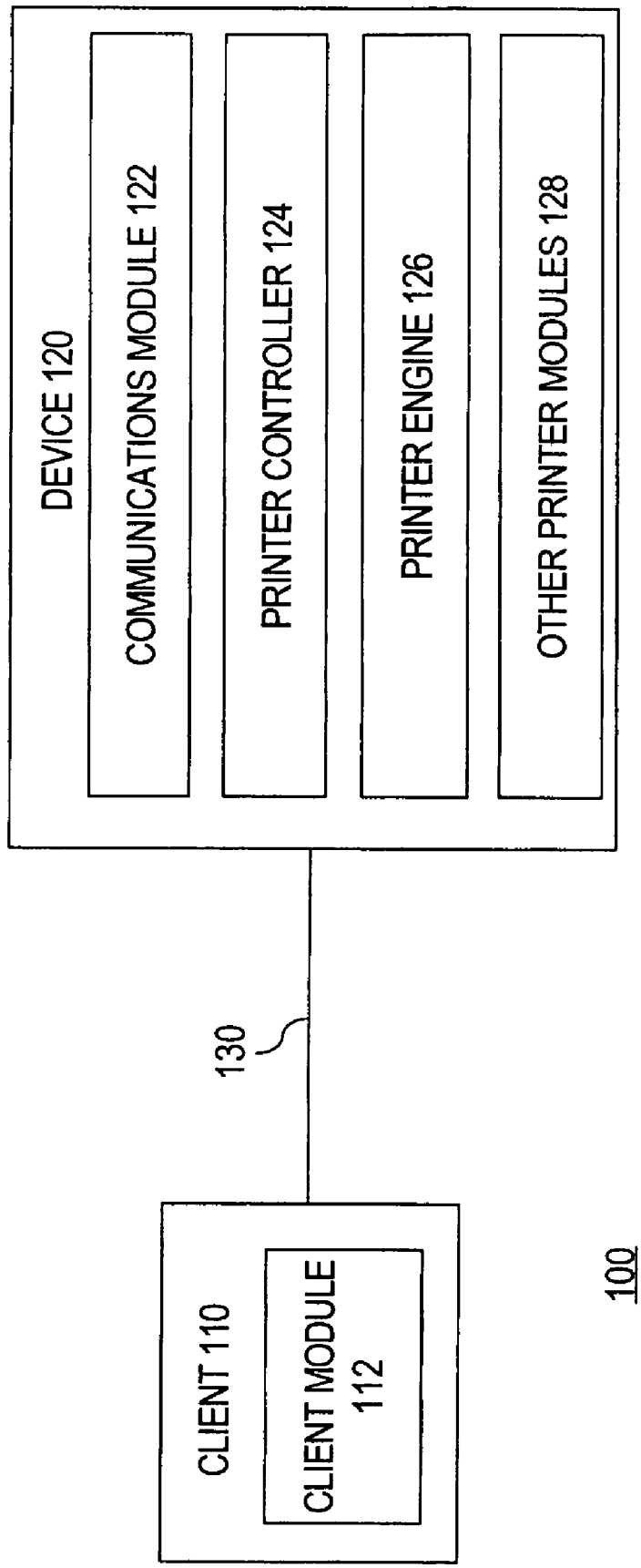
FIG. 1 is a block diagram of a system according to an embodiment of the invention.

FIG. 1 is a block diagram of a system 100 according to an embodiment of the invention. In an embodiment, system 100 comprises client 110, device 120, and communications link 130. A user may use client 110 to determine whether or not device 120 is currently in an energy-saving mode. A user may also use client 110 to instruct device 120 to either enter an energy-saving mode or exit an energy-saving mode.

Client 110 may be implemented by any medium or mechanism that provides for communicating with device 120. For example, client 110 may be a desktop computer, an embedded computer, a wireless device, a personal digital assistance (PDA), or a cell phone. Client 110 may provide an interface, which may be a graphical user interface, to a user of client 110. Non-limiting, illustrative examples of this interface include a web page, a graphical user interface provided by an operating system, a command line interface, and an application program interface (API). The user of client 110 may use this interface to interact with client 110. The interface provided by client 110 is described in further detail below.

In an embodiment, client 110 may contain client module 112. Client module 112 corresponds to software instructions, which when executed by client 110, perform certain functions, such as updating an interface provided by client 110 and/or communicating with device 120. For purposes of providing a clear illustration, only a single client is shown in FIG. 1; however, other embodiments of the invention may include any number of clients.

Device 120 represents any electronic device that is capable of operating in at least two modes, namely an energy-saving mode and a ready mode. Device 120 is intended to represent a wide variety of devices. However, for purposes of providing a clear description, examples in the specification will be described in terms of device 120 being a multi-function peripheral; however, device 120 may also be, in other embodiments, a printer, a facsimile machine, a copier, a scanner, a vending machine, a kitchen appliance, a personal computer, an embedded computer, and any other electronic device capable of operating in at least two modes that includes an energy-saving mode.

When device 120 is operating in an energy-saving mode, device 120 consumes less power by powering down one or more components of device 120 or running one or more components of device 120 at reduced power. On the other hand, when device 120 is in the ready mode, all components of device 120 are operating at full power.

In an embodiment, device 120 comprises communications module 122, controller 124, printer engine 126, and other modules 128. Communications module 122 may be implemented by any medium or mechanism that provides for exchanging communications with client module 112. For example, communications module 122 may be a set of software instructions, executed by device 120, which are responsible for exchanging communications with client module 112. Communications module 122 may also communicate with other components of device 120.

Controller 124 may be implemented by any medium or mechanism that provides for communicating with communications module 122 and processing electronic documents. For example, controller 124 may receive an electronic document that a user wishes device 120 to print, and may thereafter convert the received electronic document from being described using a page description language (PDL) into being describing using a native format that printer engine 126 can process. Controller 124 may then provide the electronic document, described using the native format that printer engine 126 can process, to printer engine 126.

Printer engine 126 refers to the component of a printing device that is responsible for performing printing functions. Thus, printer engine 126 can process an electronic document to cause one or more printed copies of the electronic documents to be produced by device 120.

Other modules 128 collectively refer to any other modules of device 120 which individually are responsible for the performance of other functionality provided by device 120. For example, device 120 may be a multi-function peripheral that provides, in additional to printing functionality, scanning, facsimile, and copying functionality. In such an exemplary device 120, one module, of modules 128 would be responsible for performing scanning functionality, another module, of modules 128, would be responsible for performing facsimile functionality, and another module, of modules 128, would be responsible for performing copying functionality.

Some embodiments may employ device 120 that lacks one or more components of device 120 shown in FIG. 1. For example, if device 120 corresponds to a vending machine, then device 120 may lack controller 124 and printer engine 126. As a result, the particular components of device 120 shown in FIG. 1 are optional.

Communications link 130 may be implemented by any medium or mechanism that provides for the exchange of data between client 110 and device 120. Examples of communications link 130 include, without limitation, a network such as a Local Area Network (LAN), Wide Area Network (WAN), Ethernet or the Internet, or one or more terrestrial, satellite or wireless links.

Having described system 100 at a high level, additional description will now be presented regarding an interface that is provided by client 110 in an embodiment of the invention.

Display of an Icon that Represents a Device

Figure 2:
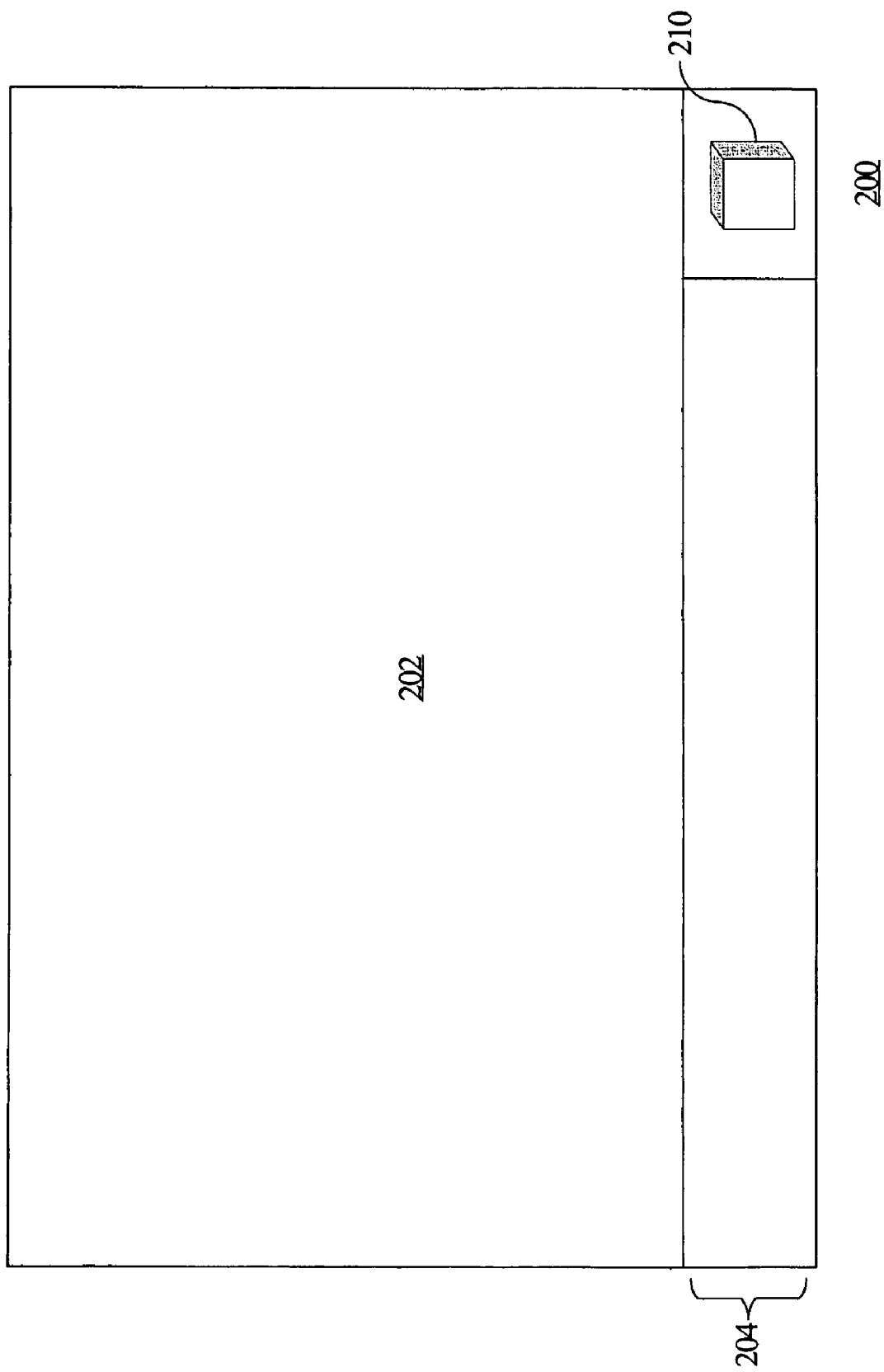
FIG. 2 is an illustration of a graphical user interface according to an embodiment of the invention.

Client 110 may provide an interface to the user to enable the user to interact with client 110. In an embodiment, the interface provided by client 110 may be a graphical user interface. To illustrate, FIG. 2 is an illustration of a graphical user interface 200 according to an embodiment of the invention. Graphical user interface 200 includes a screen portion 202, a toolbar 204, and an icon 210. Note that the visual depiction of graphical user interface 200 is merely exemplary, as other graphical user interfaces may lack a toolbar 204, display icon 210 in a different location, or otherwise differ from the illustration of FIG. 2.

Graphical user interface 200 may be implemented by a variety of mechanisms. For example, graphical user interface 200 may correspond to a web page displayed on client 110 or a graphical user interface provided by an operating system executing on client 110.

In an embodiment, the current state of device 120 is represented by the visual appearance of icon 210. In this way, a viewer of icon 210 may be able to visually ascertain information about the current state of device 120.

Figure 3:
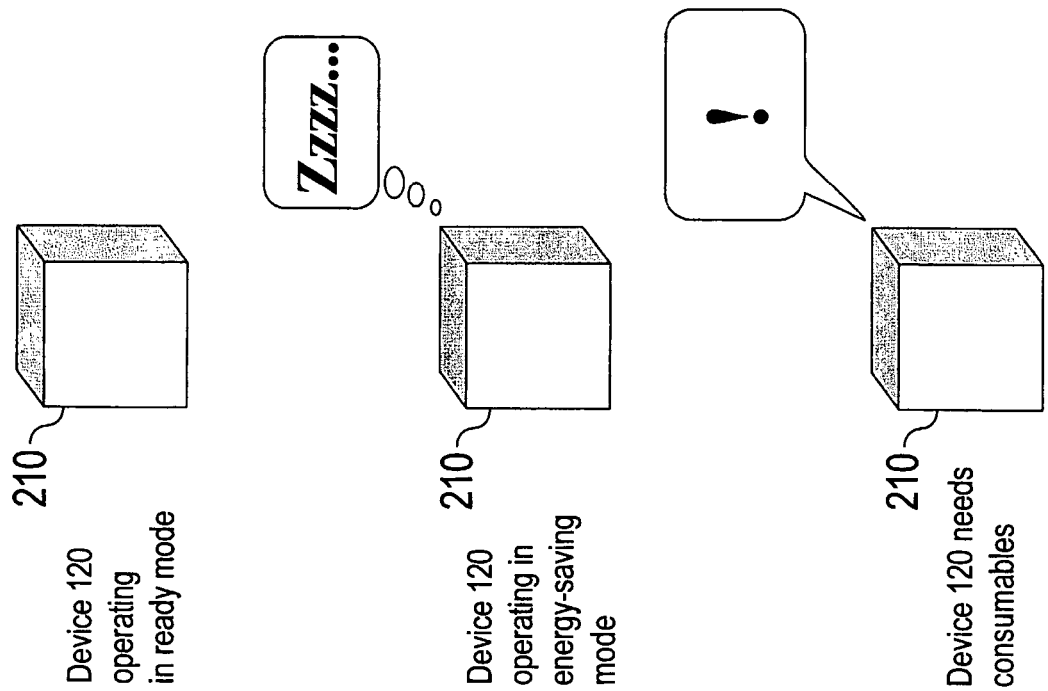
FIG. 3 is an illustration of an icon representing different states of a device according to an embodiment of the invention.

For example, FIG. 3 is an illustration of icon 210 representing different states of device 120 according to an embodiment of the invention. FIG. 3 depicts icon 210 having different visual appearances which each identify certain information about the current operational state of device 120. As shown in FIG. 3, if device 120 is currently in the ready mode, then icon 210 may be visually portrayed using a particular color on interface 200 to indicate information about the current state of device 120. For example, icon 210 may be depicted using the color green if device 120 is currently operating normally, icon 210 may be depicted using the color orange if device 120 is currently printing a document (or currently processing a request), and icon 210 may be depicted using the color red if device 120 is currently experiencing an error. As another example, icon 210 may be depicted using the color blue if device 120 is currently in an energy-saving mode.

As shown in FIG. 3, if device 120 is currently in an energy-saving mode, then icon 210 may be visually portrayed using a visual indictor on interface 200 that indicates device 120 is currently in an energy-saving mode. For example, icon 210 may be depicted with a thought bubble with a "Zzzz . . . " caption indicating that device 120 is asleep.

As another example, the display of icon 210 may indicate to a viewer that device 120 is currently in the process of exiting an energy-saving mode (i.e., device is "waking-up," but not yet "awake"). In this way, the appearance of icon 210 may be updated a first time to show that device 120 is transitioning from being in an energy-saving mode to beginning to awaken from the energy-saving mode. Thereafter, the appearance of icon 210 may be updated a second time to show that device 120 has exited the energy-saving mode (i.e., device 120 is in the ready mode).

As shown in FIG. 3, if device 120 is currently in need of consumables (such as paper or ink), then icon 210 may be visually portrayed using visual indictor on interface 200 that indicates device 120 is currently in need of consumables. For example, icon 210 may be depicted with a speech bubble within a "!" caption indicating that device 120 is in need of consumables.

The particular appearance of icon 210 in FIGS. 2 and 3 is merely illustrative, as the visual appearance of icon 210 may correspond to any shape, e.g., the shape of icon 210 may correspond to the device that it represents. Similarly, the various ways of depicting icon 210 discussed above with reference to FIG. 3 are merely illustrative, as icon 210 may be depicted any number of ways to visually portray the current operational state of device 120.

Having described the interface provided by client 110 in additional detail, additional description will now be presented regarding how a client may use the interface to issue a command to device 120 according to an embodiment of the invention.

Issuing a Command to a Device

Client 110 may provide an interface to the user to enable the user to interact with client 110. The user may use the interface to issue a command, from client 110 to device 120, e.g., the user may instruct device 120 to either enter an energy-saving mode or exit an energy-saving mode. In an embodiment, the interface provided by client 110 may be a graphical user interface. In such an embodiment, the user may issue a command to device 120 by configuring icon 210.

Figure 4:
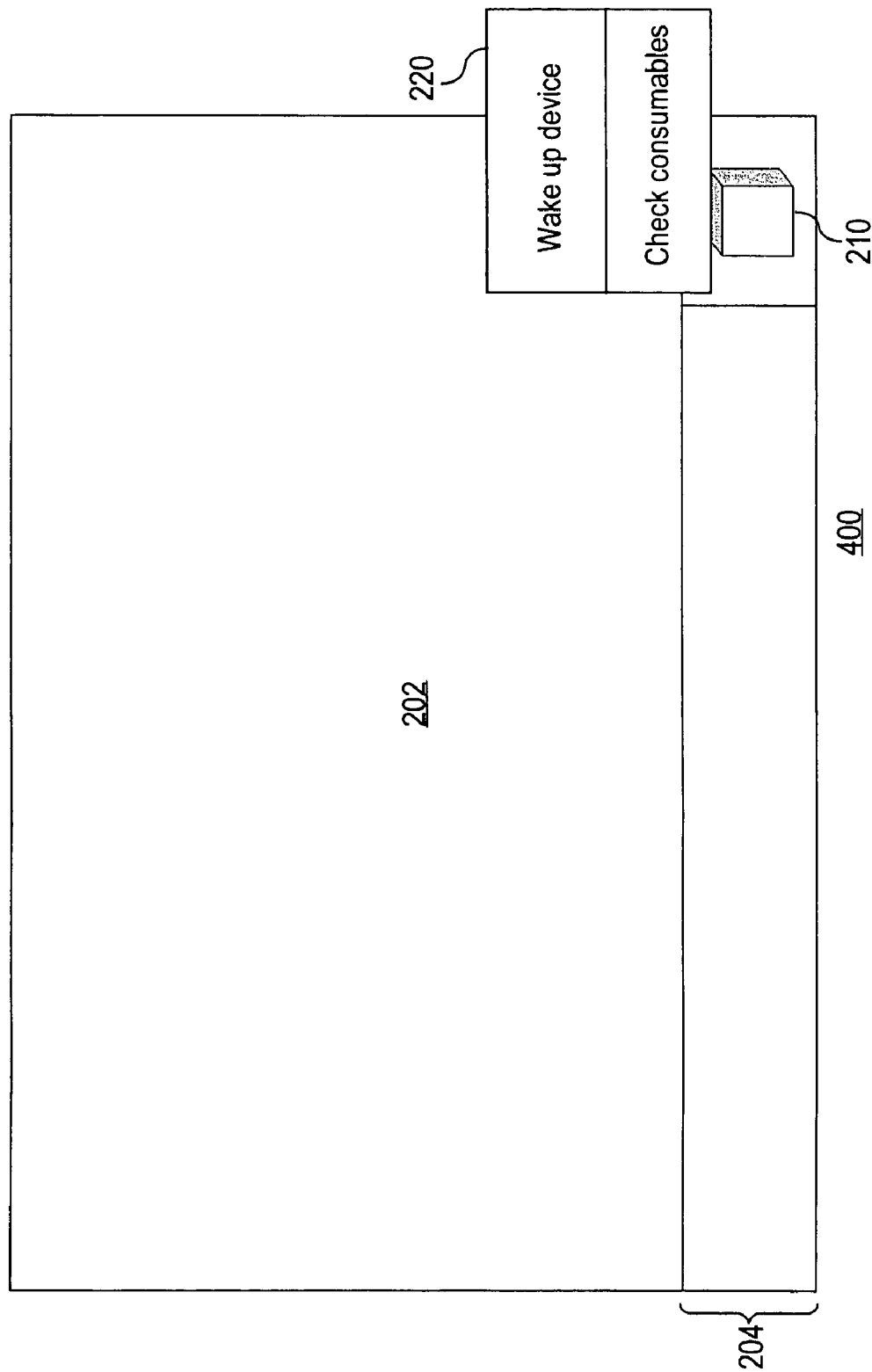
FIG. 4 is an illustration of a graphical user interface displaying a menu according to an embodiment of the invention.

FIG. 4 is an illustration of a graphical user interface displaying menu 220 according to an embodiment of the invention. Menu 220 may be displayed on graphical user interface 400 in response to client 110 receiving user input. Such user input may correspond to the user selecting icon 210 with a mouse pointer or the user pressing a button of a mouse or keyboard.

Menu 220 displays a list of commands from which the user may select. When the user selects a command from menu 220, client 110 issues a request for the performance of the command to device 120 over communications link 130. For example, menu 220 in FIG. 4 displays two commands. By selecting "Wake-up device," a user may cause a request for device 120 to exit an energy-saving mode to be sent from client 110 to device 120 over communications link 130. By selecting "check consumables," a user may cause a request for information about the level of consumables currently at device 120 to be sent from client 110 to device 120 over communications link 130.

The particular commands lists in menu 220 are merely illustrative, as any command may be included in menu 220, e.g., menu 220 may also contain a command that, when selected by a user, causes a request for device 120 to enter an energy-saving mode to be sent from client 110 to device 120 over communications link 130.

As another example, menu 220 may also contain a command that allows a user to specify that device 120 is to either enter or exit an energy-saving mode at a particular day and/or time. For example, the user may specify through menu 220 that device 120 is to enter an energy-saving mode at 6:00 PM EST Monday-Friday. In this way, device 120 may consume less power at the end of a workday. As another example, the user may specify through menu 220 that device 120 is to exit an energy-saving mode the first Saturday of each month at 8:00 AM PST. In this way, device 120 may be in the ready state when an employee drops by the office on the weekend. In an embodiment, scheduling a command to be enacted at a future date may be performed by the command being sent from client 110 to device 120 after the user has specified the command, and thereafter device 120 performs the command at the appropriate date and time. In another embodiment, scheduling a command to be enacted at a future date may be performed by the command being saved at client 110 the user configures the command, client 110 checking to determine when the command should be performed, and client 110 sending a request to perform the command to device 120 at the appropriate date and time.

In another embodiment, menu 220 may allow a user to specify commands directed to a particular component of device 120. In this way, the user may be able to instruct a specific component of device 120 (such as a printer component of a multi-function peripheral) to exit an energy-saving mode while another component of device 120 (such as a facsimile component of a multi-function peripheral) remains in the energy-saving mode. Also, the user may be able to instruct a specific component of device to enter an energy-saving mode (such as a copier component of a multi-function peripheral) while another component of device 120 is not in the energy-saving mode (such as a printer component of a multi-function peripheral).

In another embodiment, menu 220 may allow a user to specify how long device 120, or a particular component thereof, is to remain in an energy-saving mode or a ready mode. In this way, the user can instruct device 120 to remain in a ready mode or an energy-saving mode for a desired period of time.

Having described how a client may use an interface to issue a command to device 120 in additional detail, additional description will now be presented regarding the processing of such a command according to an embodiment of the invention.

Processing a Command at a Device

Figure 5:
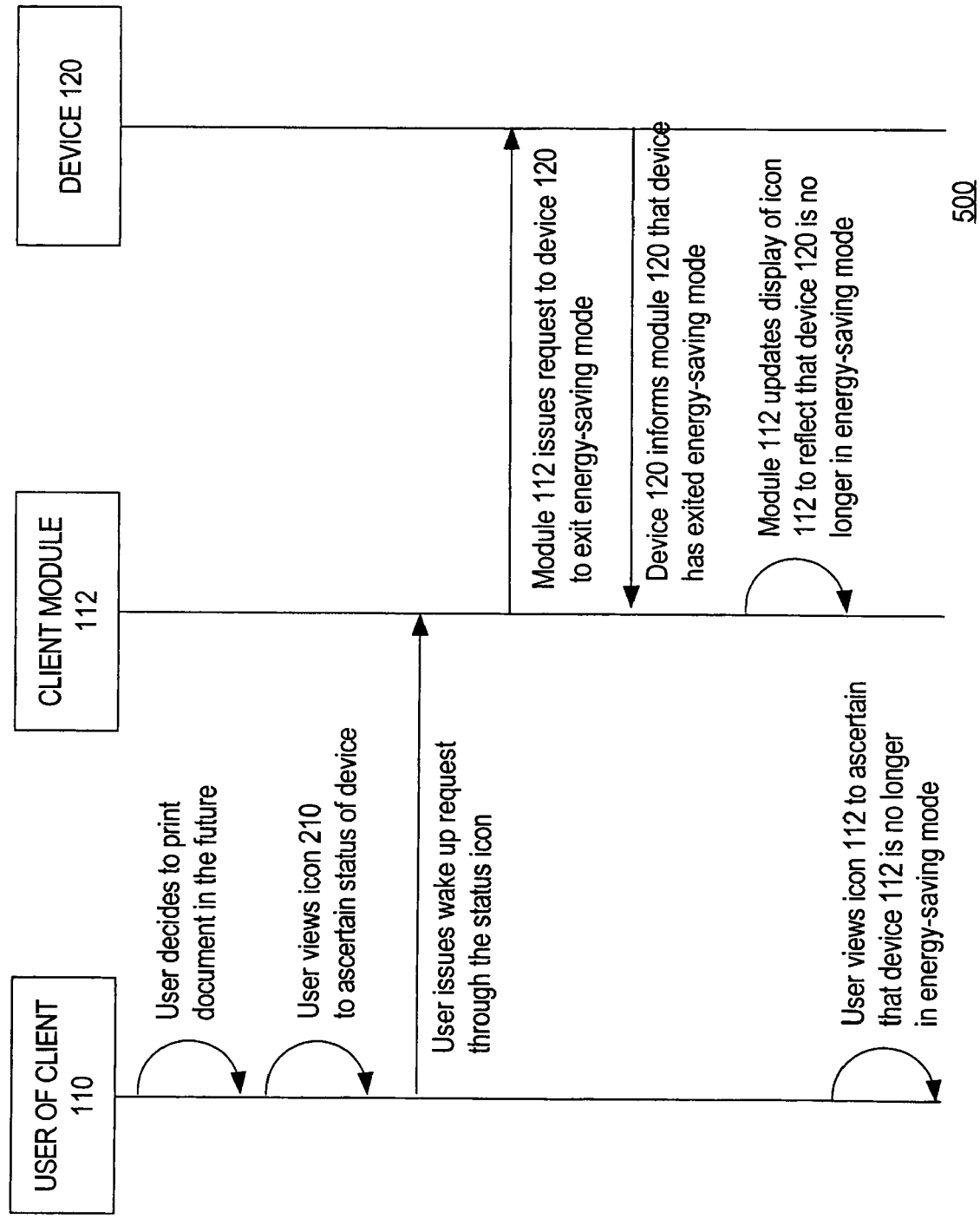
FIG. 5 is a process diagram of a user instructing a device to exit an energy-saving mode according to an embodiment of the invention.

FIG. 5 is a process diagram 500 of a user instructing device 120 to exit an energy-saving mode according to an embodiment of the invention. Process diagram 500 shall be explained with reference to a command to exit an energy-saving mode; however, the process discussed below may also be used to send other commands, such as those discussed above, from client 110 to device 120.

As shown in FIG. 5, initially a user of client 110 decides that he or she may wish to print a document in the near future. This step may be generalized as the user deciding to use device 120 in a manner that requires that device 120 to be in the ready mode. After the user decides that he or she has need to use device 120 in the ready mode, the user may access the interface provided by client 110 to determine whether device 120 is currently in the ready mode or an energy-saving mode. For example, the user may view icon 210 on a graphical user interface provided by client 110. The display of icon 210 informs the user of whether device 120 is currently in the ready mode or an energy-saving mode.

Thereafter, the user configures icon 210 for purposes of issuing a command to device 120. For example, the user may select icon 210 to cause a menu of selectable commands to be displayed, and subsequently the user may select a command from the menu. Client module 112, residing on client 110, receives input that the user has selected a command from the menu. If the user has configured the command in a particular manner, (such as supplying a particular component of device 120 or by supplying a particular day and time when the command is to be performed by device 120), then client module 112 also receives information about how the user has configured the command. For example, as shown in FIG. 5, the user may configure icon 210 for purposes of instructing device 120 to exit an energy-saving mode.

After client module 112 receives input that the user has issued a command through the interface, client module 112 issues a request for the performance of the command to device 120. In the example shown in FIG. 5, the command requests that device 120 exit an energy-saving mode. After device 120 performs the command, device 120 communicates with client module 112 that the command has been performed, e.g., device 120 communicates with client module 112 to inform client module 112 that device 120 has exited the energy-saving mode.

In an embodiment, after client module 112 has been informed that device 120 has performed the command, client module 112 may update the display of icon 210 to reflect that the command has been performed by device 120. For example, icon 210 may now be displayed in a particular color that indicates device 120 is in the ready mode. After the display of icon 210 has been updated to reflect that the command has been performed by device 120 (i.e., that device 120 is currently in the ready mode in this example), the user is able to visually ascertain that device 120 is currently in the ready mode by viewing icon 210.

As it may take some time for device 120 to exit an energy-saving mode (i.e., "wake-up"), device 120 may communicate with client module 112 to inform client module 112 that device 120 is starting the process to exit an energy-saving mode. Thereafter, once device 120 successfully exits the energy-saving mode (i.e., device 120 is awake), device 120 may communicate with client module 112 to inform client module 112 that device 120 is currently awake. In this way, client module 112 may update the display of icon 210 to reflect the progress of device 120 waking up. For example, client module 112 may initially update the display of icon 210 to indicate that device 120 has begun the process of waking up, and once client module 112 has been informed by device 120 that device 120 is awake, client module 112 may update the display of icon 210 to indicate that device is currently awake.

Figure 6:
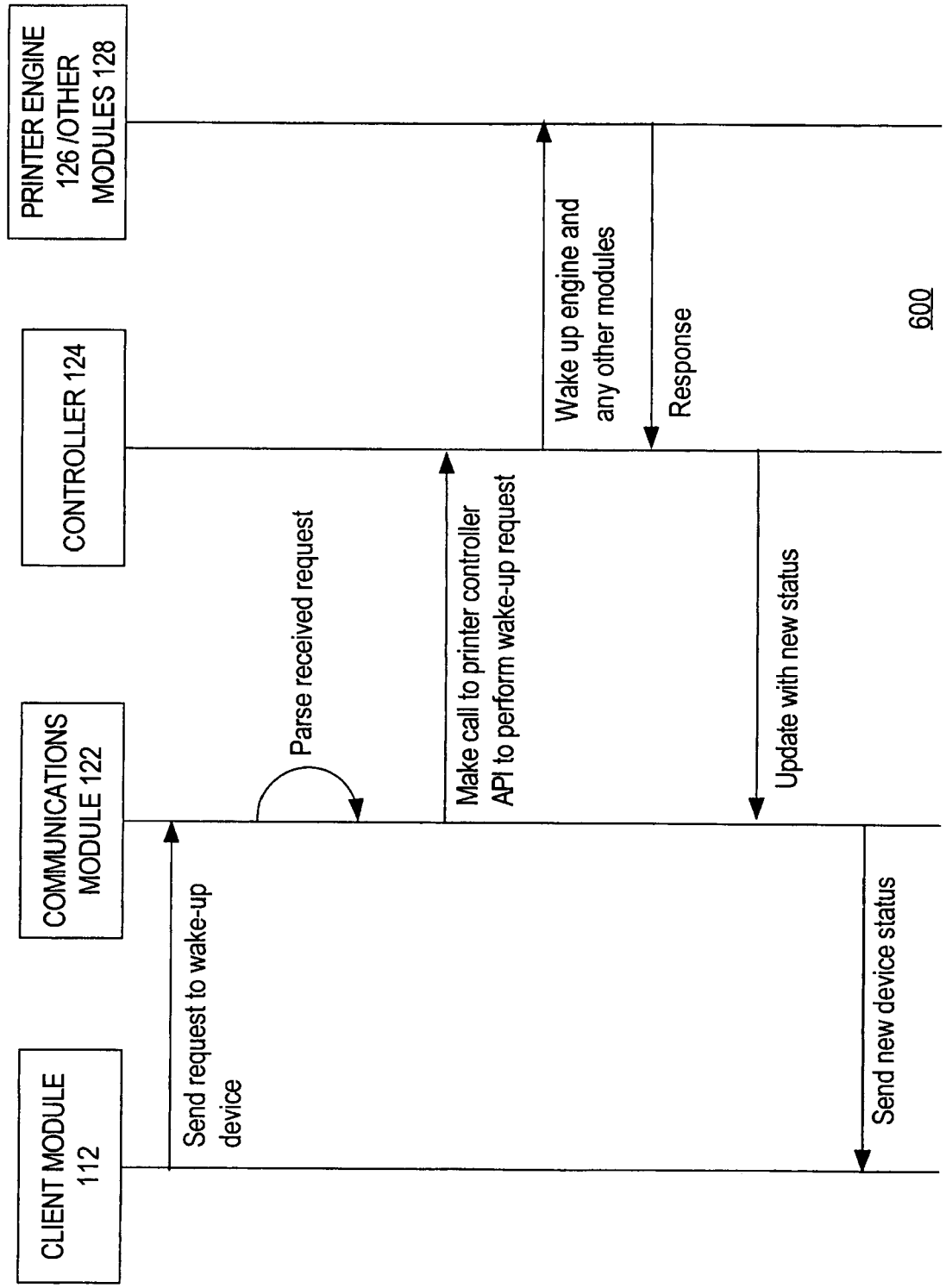
FIG. 6 is a process diagram of a device exiting an energy-saving mode according to an embodiment of the invention.

For purposes of describing the activity performed at device 120 in greater detail, consider FIG. 6, which is a process diagram of device 120 exiting an energy-saving mode according to an embodiment of the invention. Upon client module 112 sending a request for the performance of a command (such as a command to exit an energy-saving mode) to device 120, the request is received at device 120 by communications module 122. Communications module 122 parses the received request. The purpose of parsing the received request is for communications module 122 to ensure that it is a correctly formed request and to identify the type of request.

After communications module 122 has parsed the request, communications module 122 communicates with any component of device 120 necessary to perform the request. For example, as shown in FIG. 6, if the request is a request for device 120 to exit an energy-saving mode, communications module 122 communicates with controller 124 to instruct controller 124 to exit an energy-saving mode. Communications module 122 may communicate with controller 124 by making a call to an application program interface (API) of controller 124. Controller 124 may, in turn, communicate with any other components of device 120 identified by the request. For example, as shown in FIG. 6, controller 124 may communicate with printer engine 126 and/or other modules 128 to instruct those components to exit an energy-saving mode as instructed by the request. After each component has exited the energy-saving mode, those components inform controller 124.

Upon controller 124 being informed by all components involved in the request that they have exited the energy-saving mode, controller 124 informs communication module 122 that all the components of device 120 involved in the request to exit the energy-saving mode have done so. After communication module 122 has been so informed, communication module 122 notifies client module 112 that device 120 has exited the energy-saving mode as requested by client module 112.

Having described the exchange of communications between client 110 and device 120 in additional detail, additional description will now be presented about protocols that may be used in the exchange of communications between client 110 and device 120 according to an embodiment of the invention.

Implementing Protocols

Communications may be exchanged between client 110 and device 120 using a variety of protocols. Embodiments of the invention are not limited to any protocol for exchanging communications between client 110 and device 120.

In an embodiment, communications may be exchanged between client 110 and device 120 using a set of protocols called Web services. The World Wide Web Consortium ("W3C") is an international consortium that develops standards for the World Wide Web. The W3C defines a "web service" as a software system that is designed to support interoperable machine-to-machine interaction over a network. This definition encompasses many different systems, but in common usage, the term refers to those services that use SOAP-formatted Extensible Markup Language ("XML") envelopes and that have their interfaces described by Web Services Description Language ("WSDL"). Web services allow devices and applications to communicate with each other over one or more networks without the intervention of any human being, while using the same suite of protocols (e.g., Hypertext Transfer Protocol ("HTTP")) that a human being would use to communicate with such devices and applications over one or more networks.

The specifications that define web services are intentionally modular, and, as a result, there is no one document that defines all web services. Instead, there are a few core specifications that are supplemented by other specifications as the circumstances and choice of technology dictate. Common core specifications include SOAP, WSDL, WS-Security, WS-Eventing, WS-addressing, Printer DCP, and WS-ReliableExchange. Different specifications address different tasks and functions. These specifications are publicly available from the W3C.

FIG. 7 is an illustration of communications exchanged between client module 112 and communications module 122 according to an embodiment of the invention. As shown in FIG. 7, the request from client module 112 to communications module 122 has a SOAP-formatted XML envelope. Portion 702 of the request may correspond to a command to instruct device 120 to exit an energy-saving mode. The portion 702 may also include optional data that contains additional instructions for how device 120 is to exit the energy-saving mode. For example, as shown in portion 702, portion

702 may instruct device 120 to remain awake (i.e., in the ready mode) for at least 30 minutes and may specifically identify the component of device responsible for printing to exit an energy-saving mode.

The response from communications module 122 to client module 112 depicted in FIG. 7 also has a SOAP-formatted XML envelope. The response of FIG. 7 illustrates that device 120 has awakened the printing capabilities of device 120 (i.e., the component responsible for printing of device 120 has exited the energy-saving mode).

FIG. 8 is a process diagram of client module 112 communicating with communications module 122 according to an embodiment of the invention. In the embodiment depicted in FIG. 8, communications between client module 112 and communications module 122 may be performed using WS-eventing. WS-eventing is a web services protocol that allows subscribers to register to receive notification of status updates concerning certain events. In this way, client module 112 may register with communications module 122 to receive status updates concerning various operational characteristics of device 120. For example, client module 112 may register with communications module 122 to receive status updates concerning whether device 120 is in an energy-saving mode or whether device 120 has a specified amount of consumable resources.

As shown in FIG. 8, client module 112 sends a request to subscribe to an event, in accordance with the WS-eventing protocol, to communications module 122. For purposes of this example, the event is a change in the mode device 120 is operating in, i.e., when device 120 enters or exits an energy-saving mode. After communications module 122 receives the request to subscribe to the event from client module 112, communications module 122 sends a response to client module 112 to inform client module 112 whether the request to subscribe to the event was successful. Assuming the request to subscribe to the event was successfully performed by communications module 122, communications module 122 sends a response to client module 112 to inform client module 112 that client module 112 has successfully subscribed to the event.

Thereafter, upon device 120 entering an energy-saving mode, communications module 122 informs client module 112 that device 120 is in an energy-saving mode. In response, client module 112 may update the display of icon 210 to reflect that device 120 is currently in an energy-saving mode.

Client module 112 may thereafter send, to communications module 122, a command to cause device 120 to exit an energy-saving mode. Upon receiving the command, communications module 122 sends a message to client module 112 informing client module 112 that the command was received.

In an embodiment, when device 120 starts to exit the energy-saving mode, communications module 122 notifies client module 112 that device 120 is starting to exit the energy-saving mode. Client module 112 may, in turn, update the display of icon 210 to reflect that device 120 is starting to exit the energy-saving mode.

Once device 120 has exited the energy-saving mode, communications module 122 notifies client module 112 that device 120 has exited the energy-saving mode. In response, client module 112 may update the display of icon 210 to reflect that device 120 is currently not in an energy-saving mode.

At some point after device 120 has exited the energy-saving mode, device 120 may reenter the energy-saving mode (for example, perhaps due to inactivity). As before, when device 120 enters the energy-saving mode, communications module 122 informs client module 112 that device 120 is in an energy-saving mode. In response, client module 112 may update the display of icon 210 to reflect that device 120 is currently in an energy-saving mode.

While the interaction depicted in FIG. 8 involves client module 112 receiving information from communications module 122 concerning whether device 120 is in an energy-saving mode, using the process described above, client module 112 may receive information about other characteristics of device 120 which may change over time. For example, using the process depicted in FIG. 8, client module 112 may be informed of the level of consumable resources at device 120.

Production Printing Environment

Embodiments of the invention may be used in a production environment where different physical machines perform different tasks of a single project. For example, a document processing company may employ one or more machines directed towards printing, another one or more machines directed towards applying finishes to the printed document, another set of one or more machines directed towards binding the finished documents, another set of one or more machines directed towards cutting the bound documents, and so on. Each set of one or more machines directed towards a single task (such as printing or finishing) shall be referred to as a logical device group.

FIG. 9 is a process diagram of a system 900 involving two or more logical device groups according to an embodiment of the invention. FIG. 9 depicts several logical device groups. The logical device groups depicted in FIG. 9 are directed towards the tasks of printing, finishing, binding, and cutting. FIG. 9 also depicts a controller program. A controller program is software that instructs each of the logical device groups to begin a unit of work.

As shown in FIG. 9, the controller program may send an instruction to the logical device group directed to printing ("the print group") to start a job. Once the print group is done printing, the logical device group directed to finishing ("the finish group") is able to start processing the printing documents. The controller program may estimate how long it will take for the print group to finish performing the work it has been instructed to do, and may send an instruction to the finish group to wake-up (exit an energy-saving mode and enter a ready mode) so that when the finish group wakes-up contemporaneous with when the print group is finished printing the work it has been assigned.

Similarly, the controller program may estimate how long it will take for the finish group to finish performing the work it has been instructed to do, and may send an instruction to the group directed to binding ("the binding group") to wake-up (exit an energy-saving mode and enter a ready mode) so that the binding group wakes-up contemporaneous with when the finish group is finished performing the work it has been assigned. Similarly, the controller program may estimate how long it will take for the binding group to finish performing the work it has been instructed to do, and may send an instruction to the group directed to cutting ("the cutting group") to wake-up (exit an energy-saving mode and enter a ready mode) so that the cutting group wakes-up contemporaneous with when the binding group is finished performing the work it has been assigned.

In this way, greater efficiency may be obtained in a production environment as devices may be woken up (i.e., entering a ready mode from an energy-saving mode) just in time to process new work. Thus, devices may be operated at reduced power when the devices are not performed work, yielding cost savings for the owner of the devices.

Implementing Mechanisms

Figure 10:
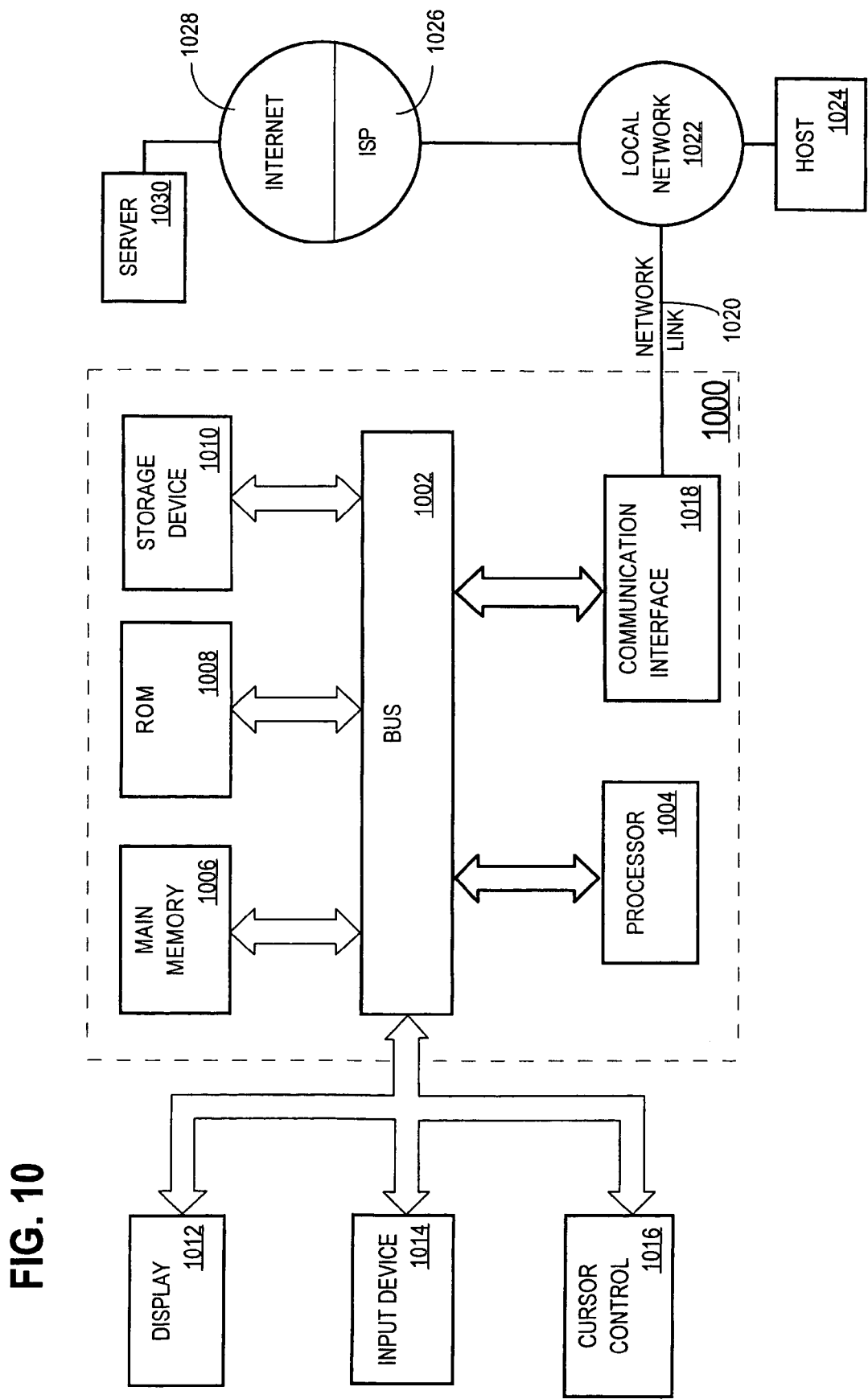
FIG. 10 is a block diagram that illustrates a computer system upon which an embodiment of the invention may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1000, various machine-readable media are involved, for example, in providing instructions to processor 1004 for execution. Such a medium may take many forms, including but not limited to, non-volatile media, and volatile media. Non-volatile media includes, for example, optical or magnetic disks, such as storage device 1010. Volatile media includes dynamic memory, such as main memory 1006.

Common forms of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for performing a process involving a first device and a second device, wherein the second device operates upon output produced by the first device, the method comprising:
   instructing the first device to perform a unit of work;
   determining an estimate of how much time the first device will require to perform the unit of work; and
   instructing, based on the estimate, the second device to exit an energy-saving mode so that the second device is able to perform work on the output produced by the first device substantially contemporaneous with when the first device has finished performing said unit of work.

2. A machine-readable medium carrying one or more sequences of instructions for performing a process involving a first device and a second device, wherein the second device operates upon output produced by the first device, wherein execution of the one or more sequences of instructions by one or more processors causes: instructing the first device to perform a unit of work;
   determining an estimate of how much time the first device will require to perform the unit of work; and
   instructing, based on the estimate, the second device to exit an energy-saving mode so that the second device is able to perform work on the output produced by the first device substantially contemporaneous with when the first device has finished performing said unit of work.

3. An apparatus for performing a process involving a first device and a second device, wherein the second device operates upon output produced by the first device, the apparatus comprising:
   one or more processors; and
   a memory storing instructions, which when processed by the one or more processors, cause:
      instructing the first device to perform a unit of work;
      determining an estimate of how much time the first device will require to perform the unit of work; and
      instructing, based on the estimate, the second device to exit an energy-saving mode so that the second device is able to perform work on the output produced by the first device substantially contemporaneous with when the first device has finished performing said unit of work.

4. A computer-implemented method as recited in claim 1, wherein the first device is a printer and the output produced by the first device includes a printed document.

5. A computer-implemented method as recited in claim 1, wherein the first device and the second device are one or more of a printing device, a finishing device, a binding device or a cutting device.

6. A computer-implemented method as recited in claim 1, wherein the steps of determining the estimate and instructing the first device and instructing the second device are performed by a control process executing on a client device that is different than the first device and the second device.

7. A computer-implemented method as recited in claim 1, further comprising instructing the first device to exit an energy-saving mode prior to instructing the first device to perform a unit of work.

8. A computer-implemented method as recited in claim 1, further comprising:
   determining a second estimate of how much time the second device will require to perform the work on the output produced by the first device; and
   instructing, based on the second estimate, a third device to exit the energy-saving mode so that the third device is able to perform work on second output produced by the second device substantially contemporaneous with when the second device has finished performing the work on the output produced by the first device.

9. A computer-readable medium as recited in claim 2, wherein the first device is a printer and the output produced by the first device includes a printed document.

10. A computer-readable medium as recited in claim 2, wherein the first device and the second device are one or more of a printing device, a finishing device, a binding device or a cutting device.

11. A computer-readable medium as recited in claim 2, wherein the steps of determining the estimate and instructing the first device and instructing the second device are performed by a control process executing on a client device that is different than the first device and the second device.

12. A computer-readable medium as recited in claim 2, further comprising additional instructions which, when processed by the one or more processors, causes instructing the first device to exit an energy-saving mode prior to instructing the first device to perform a unit of work.

13. A computer-readable medium as recited in claim 2, further comprising additional instructions which, when processed by the one or more processors, causes:
   determining a second estimate of how much time the second device will require to perform the work on the output produced by the first device; and
   instructing, based on the second estimate, a third device to exit the energy-saving mode so that the third device is able to perform work on second output produced by the second device substantially contemporaneous with when the second device has finished performing the work on the output produced by the first device.

14. An apparatus as recited in claim 3, wherein the first device is a printer and the output produced by the first device includes a printed document.

15. An apparatus as recited in claim 3, wherein the first device and the second device are one or more of a printing device, a finishing device, a binding device or a cutting device.

16. An apparatus as recited in claim 3, wherein the steps of determining the estimate and instructing the first device and instructing the second device are performed by a control process executing on a client device that is different than the first device and the second device.

17. An apparatus as recited in claim 3, further comprising additional instructions which, when processed by the one or more processors, causes instructing the first device to exit an energy-saving mode prior to instructing the first device to perform a unit of work.

18. An apparatus as recited in claim 3, further comprising additional instructions which, when processed by the one or more processors, causes:
   determining a second estimate of how much time the second device will require to perform the work on the output produced by the first device; and
   instructing, based on the second estimate, a third device to exit the energy-saving mode so that the third device is able to perform work on second output produced by the second device substantially contemporaneous with when the second device has finished performing the work on the output produced by the first device.

* * * * *